(12) United States Patent
Chan (10) Patent No.: US 6,289,200 B1
(45) Date of Patent: *Sep. 11, 2001

(54) INFORMATION DISTRIBUTION SYSTEM WHICH INTERMITTALY TRANSMITS RADIO FREQUENCY SIGNAL DIGITAL DATA

(76) Inventor: Hark C. Chan, 861 Brent Dr., Cupertino, CA (US) 95014

( * ) Notice: Subject to any disclaimer, the term of this patent is extended or adjusted under 35 U.S.C. 154(b) by 0 days.

This patent is subject to a terminal disclaimer.

(21) Appl. No.: 09/471,952

(22) Filed: Dec. 23, 1999

Related U.S. Application Data (63) Continuation of application No. 08/939,368, filed on Sep. 29, 1997, now Pat. No. 6,021,307, which is a continuation-in-part of application No. 08/644,838, filed on May 10, 1996, now abandoned, which is a continuation-in-part of application No. 08/279,424, filed on Jul. 25, 1994, now abandoned.

(51) Int. Cl.$^7$ .............................. H04H 3/00; H04L 12/66
(52) U.S. Cl. ...................... 455/3.01; 370/352; 725/136
(58) Field of Search .................. 455/3.1, 6.2, 450, 455/3.01; 725/136; 370/352

(56) References Cited

U.S. PATENT DOCUMENTS

| | | | |
|---|---|---|---|
| 4,215,406 | 7/1980 | Gomola, et al. ...................... 364/468 |
| 4,442,502 | 4/1984 | Friend et al. ........................ 364/900 |
| 4,556,904 | 12/1985 | Monat .................................. 358/147 |
| 4,768,087 | 8/1988 | Taub et al. ............................. 358/84 |
| 5,519,866 | 5/1996 | Lawrence et al. ................... 395/700 |
| 5,640,192 | 6/1997 | Garfinkle ................................ 348/1 |
| 5,887,243 | * 3/1999 | Harvey et al. ....................... 725/136 |
| 5,933,604 | 8/1999 | Inakoshi .......................... 395/200.56 |
| 5,954,793 | 9/1999 | Stutman et al. ..................... 709/204 |
| 5,961,593 | 10/1999 | Gabber et al. ....................... 709/219 |
| 5,968,129 | 10/1999 | Dillon ................................. 709/233 |
| 5,995,725 | 11/1999 | Dillon ........................... 395/200.33 |
| 5,999,525 | * 12/1999 | Krishnaswamy et al. ........... 370/352 |
| 6,021,307 | * 2/2000 | Chan ................................... 455/3.1 |

OTHER PUBLICATIONS

David Raggett, HTML+(Hypertext Markup Language), pp. 1–31, Jul. 12, 1993, WWW Discussion Group Request for Comments.*

Gautier, et al., "Automatic Program Recording System", Radiodiff et TV, Nov. 1975.

* cited by examiner

Primary Examiner—William Cumming (57) ABSTRACT

An information distribution and processing system contains a central site, a transmitter and a receiving device. The central site contains a first set of digital data. The transmitter delivers a second set of digital data to the receiving device. In one embodiment of the present invention, the receiving device contain a timing device for automatically receiving the second set of digital data at predetermined times. In another embodiment, the transmitter transmits an alert signal indicating a transmission of the second set of digital data. The second set of digital data contains a first set of displayable data, a second set of displayable data, at least one non-displayable symbol, and at least one linking reference associated with the second set of displayable data. If desired, a user can select the second set of displayable data. The associated linking reference is sent to the central site. The associated linking reference is used by the central site to search for the additional information, and returns the requested information to the user.

40 Claims, 3 Drawing Sheets

Fig. 1

K-S Particle Found

Two physicists announced that they had found the K-S particle. If confirmed, this will verify the theory of the Nobel laureates, Professors Kendrick Chan and Sophia Chan, who first postulated the existence of the K-S particle ten years ago. The physicists, Drs. Lisa Smith and John Doe, showed computer generated results indicating the detection of the K-S particles in a series of experiments carried out at the International Super-High Energy Accelerator.

FIG. 2A

K-S Particle Found¶ ¶  Two physicists announced that they had found the ⸢K-S particle⸢⌘FE330AB⌘. If confirmed, this will verify the theory of the Nobel laureates, Professors ⸢Kendrick Chan⸢⌘A245DC8⌘ and ⸢Sophia Chan⸢⌘85AC258⌘, who first postulated the existence of the K-S particle ten years ago. The physicists, Drs. ⸢Lisa Smith⸢⌘3098BE6z⌘ and ⸢John Doe⸢⌘EAC7835⌘, showed computer generated results indicating the detection of the K-S particles in a series of experiments carried out at the ⸢International Super-High Energy Accelerator⸢⌘C347A49⌘.¶

INFORMATION DISTRIBUTION SYSTEM WHICH INTERMITTALY TRANSMITS RADIO FREQUENCY SIGNAL DIGITAL DATA

This application is a continuation of application Ser. No. 08/939,368 filed Sep. 29, 1997 now U.S. Pat. No. 6,021,307, which is a continuation in part of application Ser. No. 08/644,838 filed May 10, 1996, now abandoned, which is a continuation in part of application Ser. No. 08/279,424 filed Jul. 25, 1994, now abandoned. All these patent applications are incorporated herein by reference.

FIELD OF THE INVENTION

This invention relates generally to information distribution, and more particularly to distributing information using a broadcast channel and a bidirectional communication channel.

BACKGROUND OF THE INVENTION

Recent advancements in modem and computer technology allow large amount of digital data to be transmitted electronically. A number of information providers (such as newspaper and magazine publishers) and on-line information distributors have formed partnerships to deliver newspaper and other information on-line. In this system, a subscriber uses a computer and a modem to connect, through a regular phone line, to the computer of an online information provider. The subscriber can retrieve information, including newspaper articles, stored in the computer of the information provider.

On-line delivery of newspaper has many advantages. For example, the information can be updated throughout the day while the printed version is printed only once or twice a day. Further, it is possible to do text-based searches on the information. However, it is found that on-line deliver of newspaper and other information is slow. For example, a subscriber has to wait many seconds for a newspaper article to be delivered. The quality of the electronic newspaper is low. For example, in order to reduce storage and communication requirements, graphic images appeared in the printed version are not universally supplied in the on-line version of newspaper. One of the reasons for such poor performance is the limited bandwidth of communication channels used by on-line information distributors. Another reason is that information is centrally processed by the computer at the site of the information distributor, with the result that each subscriber only gets a small slice of the time of the computer.

SUMMARY OF THE INVENTION

The present invention uses two channels to deliver digital information, a broadcast channel and a bidirectional channel. The broadcast channel is used to deliver the bulb of the digital information to subscribers. The amount of information delivered is preferably sufficient to satisfy the needs of a large number of subscribers so that they do not have to obtain additional information using the bidirectional channel. The broadcasted information is stored on fast storage media located at subscriber sites. As a result, search and retrieval of the broadcasted information is quick. Further, the broadcasted information is processed locally using a dedicated on-site processor instead of relying on the computers of the information distributors. As a result, the load on the computers of the information distributors is reduced. If the subscribers desire to receive additional information relating to the broadcasted information, the bidirectional communication channel is used to transmit the request and the requested information.

The distribution costs of broadcast channels are typically much lower than that of a bidirectional communication channel. Consequently, the major portion of information is delivered using low cost distribution channels. For a large number of subscribers, the broadcasted information will provide all the information they normally need. Thus, expensive bidirectional communication channels are used only occasionally.

These and other features and advantages of the present invention will be fully understood by referring to the following detailed description in conjunction with the accompanying drawings.

DETAILED DESCRIPTION OF THE INVENTION

Figure 1:
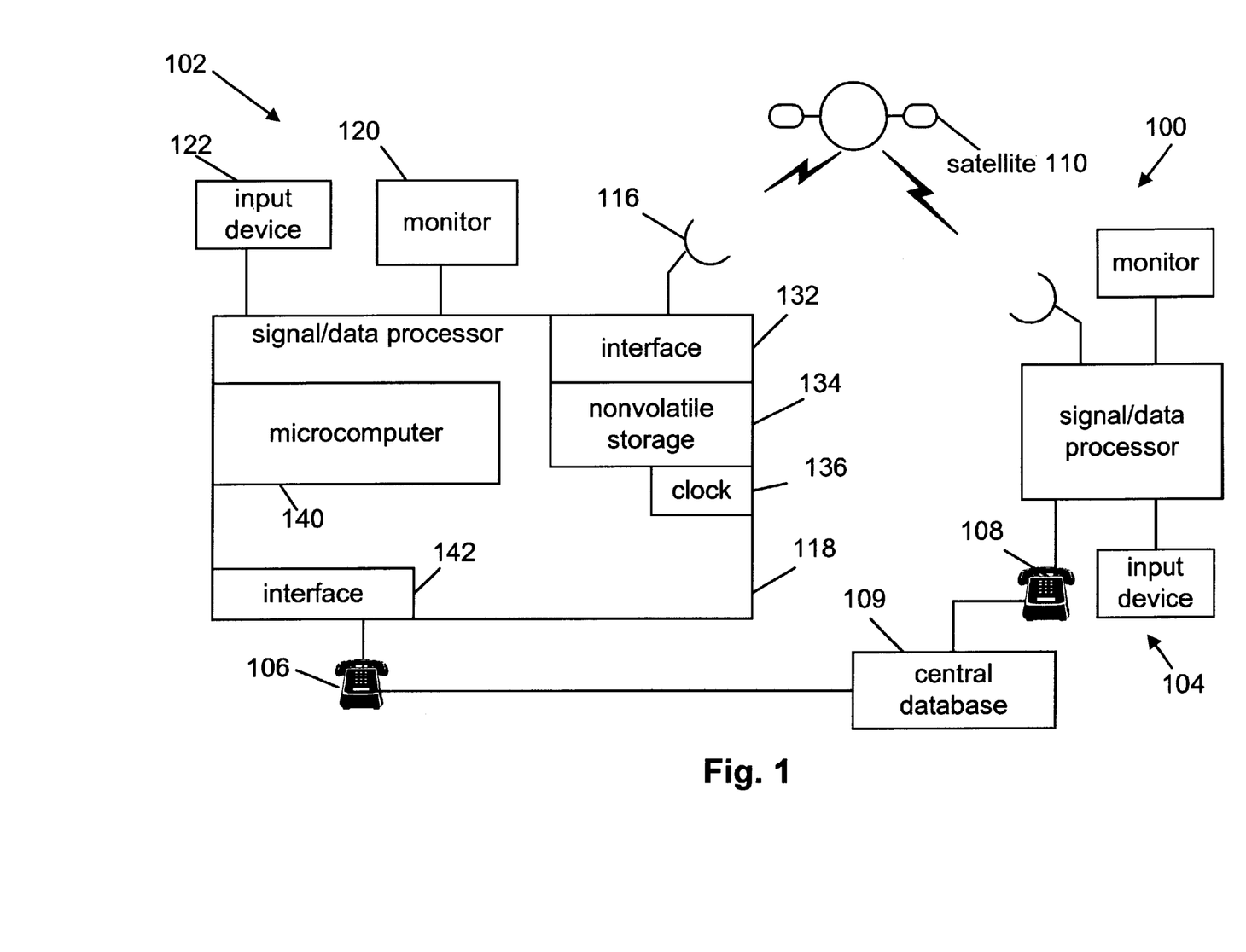
FIG. 1 is a schematic drawing showing an information distribution system of the present invention.

FIG. 1 is a block diagram of an information distribution system 100 in accordance with the present invention. In this embodiment, system 100 is designed to electronically distribute newspaper. It should be pointed out that system 100 can also be used advantageously to distribute other types of information. System 100 contains a plurality of subscriber units (such as units 102 and 104) each connected to a bi-directional communication channel (e.g., telephone connections 106 and 108 coupled to units 102 and 104, respectively) and a satellite transponder 110 for broadcasting digital data to these subscriber units. Telephone connections 106 and 108 (which could be line-based or wireless) are coupled to a central database 109. In system 100, satellite transponder 110 is used to broadcast the content of a newspaper to the subscriber units while telephone connections 106 and 108 are used to provide additional information (stored in central database 109) to subscriber units 102 and 104, respectively, on a demand basis.

The structure of these subscriber units are substantially identical; consequently, only one of these units, such as unit 102, is described in detail. Unit 102 contains an antenna 116 for receiving broadcast signals from satellite transponder 110, a signal/data processor 118 for performing signal and data processing functions, a monitor 120 for displaying the electronic newspaper, and an input device 122 (such as a keyboard and/or a mouse).

Signal/data processor 118 contains a transponder interface 132 for processing transponder signal received from antenna 116. Transponder interface 132 typically contains a low noise receiver for receiving high frequency (e.g., C or Ku band) transponder signal and a "universal data interface" for converting the transponder signal to digital data. The retrieved data is stored in nonvolatile storage 134, such as a hard disk or solid state flash memory. Preferably, satellite transponder 110 broadcasts the newspaper data at predetermined times. Thus, a real-time clock 136 is preferably used to turn on interface 132 at the predetermined times. Processor 118 contains a microcomputer 140 which coordinates the operation of clock 136, nonvolatile storage 134, and interface 132. Processor 118 also contains a communication interface 142 for sending and receiving digital data from central database 109 through telephone connection 106.

The time for broadcast is preferably chosen when communication load of transponder 110 is at a low level (e.g., around mid-night). As a result, the cost of information delivery is low. Alternatively, the time of broadcasting is chosen by transponder 110 because it knows when communication load is light. In this case, transponder 110 first sends a signal to signal/data processor 118 for alerting processor 118 to receive and process the newspaper information.

A user can use the input device 122 and monitor 120 to read the content of the electronic newspaper stored in nonvolatile storage 134. In this embodiment, the complete content of the newspaper is stored in nonvolatile storage 134. The term "complete content" means that the user is able to read the newspaper without relying on information stored in central database 109 (although other embodiments may deliver less than the complete content). In this aspect, system 100 functions in a similar way as the distribution of a conventional printed newspaper. However, the digital data of the electronic newspaper delivered by satellite transponder 110 preferably contains linkage reference which allows fast retrieval of additional information from central database 109.

If the newspaper information received from satellite transponder 110 is sufficient to satisfy the needs of a user, signal/data processor 118 will not activate telephone connection 106. However, if the user wishes to receive additional information relating to an item mentioned in the electronic newspaper (e.g., by selecting at the item using the input device), process 118 will retrieve the information stored in central database 109 using the embedded linkage reference.

In system 100 of the present invention, the complete content of the electronic newspaper (including graphics and other multimedia contents, if delivered) is stored in nonvolatile storage 134, which has fast access time. Further, a dedicated processor (i.e., microcomputer 140) is used to process newspaper information. On the other hand, prior art on-line newspaper distribution systems rely on modem to deliver the content of the newspaper stored in a central site. Further, the processor in the central site has to serve many users in delivering the newspaper. As a result, system 100 has superior performance compared to the prior art on-line newspaper delivery systems.

If it is desirable to limit circulation of the newspaper to a certain class of subscribers only (e.g., paid subscribers), the data transmitted by transponder 110 could be encrypted. As a result, only subscribers who have a decryption key are able to read the newspaper, In the case, microcomputer 140 also performs decryption functions.

Figure 2A:
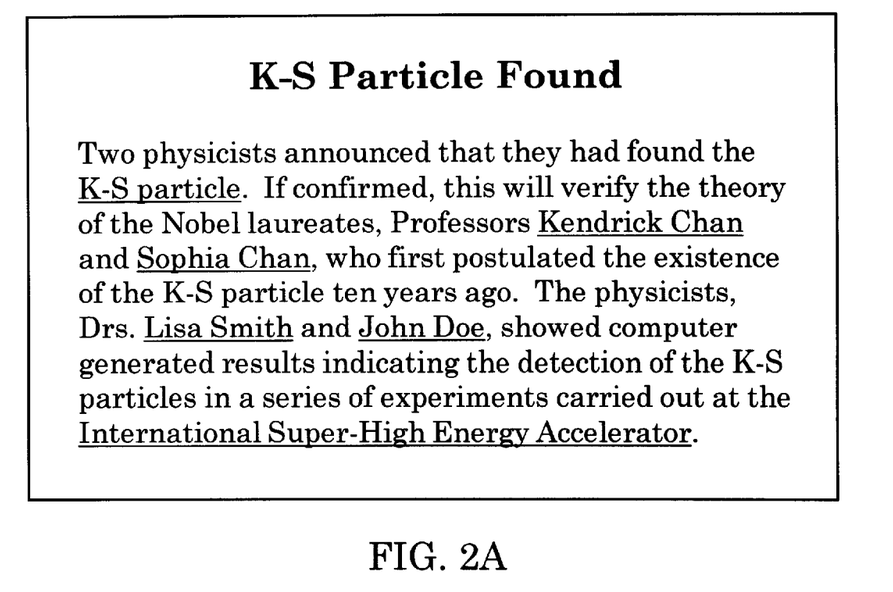
FIG. 2A shows a newspaper article as displayed on a monitor of the information distribution system shown in FIG. 1.

FIG. 2A shows an example of a portion of a newspaper article as seen on monitor 120. In FIG. 2A, the terms which a user may obtain additional information are underlined (or highlighted in other ways, such as setting in different colors, depending on the choice of the publisher) If desired, the user may select these terms using a pointing device, such as a mouse, and signal/data processor 118 will obtain the additional information from central database 109.

Figure 2B:
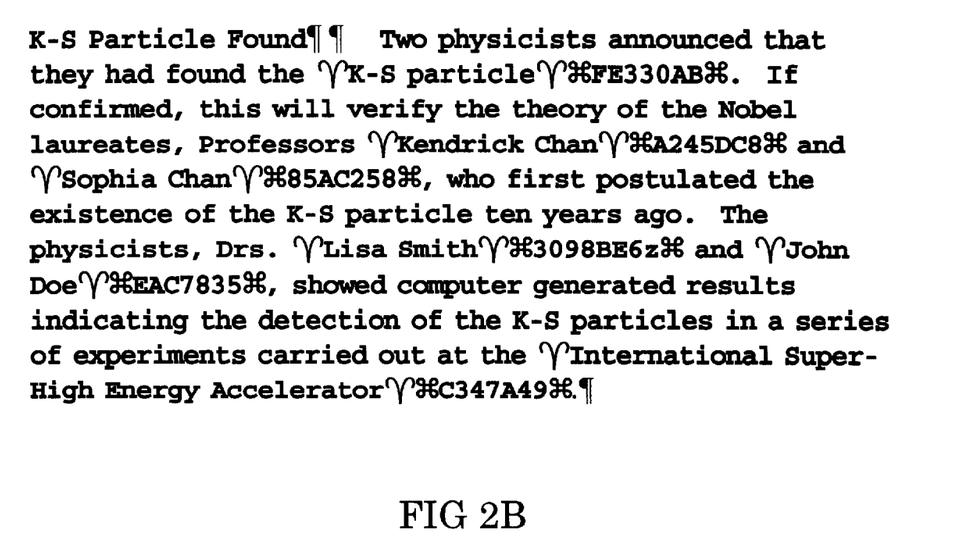
FIG. 2B shows the contents of the broadcast information which corresponds to the newspaper article of FIG. 2A.

FIG. 2B shows the same portion in FIG. 2A as transmitted by transponder 110 (for simplicity, the embedded formatting codes, such as center, bold, etc., are not shown). Each of the terms underlined in FIG. 2A are enclosed by a special symbol (e.g., the "γ" symbol) and followed by a linkage reference enclosed by another special symbol (e.g., the "⌘" symbol). These symbols are invisible to the users and is recognizable only by microcomputer 140.

When an underlined term in FIG. 2A is selected by a user, microcomputer 140 extracts the linkage reference and transmits it to central database 109. The linkage reference allows central database 109 to retrieve the necessary information quickly without doing extensive searches. As a result, the response time of system 100 is fast. The retrieved information can itself contains linkage references and can be searched.

If the speed of searching and retrieving data by central database 109 is fast, it may not be necessary to include linkage reference in the information broadcasted by transponder 110. In this case, the user selects (e.g., using the mouse) words and terms he/she is interested in. Signal/data processor 118 transmits the selected items to central database 109, which searches for matches in its database. Matched information is sent to subscriber unit 102 for processing.

The bi-directional channel also allows updating of the broadcasted information. There is typically a time difference between the broadcast and display of information. New information gathered during this time difference can be stored in central database 109 and later transmitted to signal/data processor 118.

In this embodiment of the present invention, satellite transponder 110 is used as the vehicle to electronically broadcast newspaper. However, other broadcast distribution methods can be used. In the present invention, broadcast is defined as one-to-many distribution of information. The broadcast distribution channels do not have to be electrical. For example, the present invention allows the distribution of CDROMs encoded with digital information to the subscriber sites. In the case of electrical broadcast communication channels, both wired and wireless can be used. Preferably, unidirectional channels are used for broadcast because of their low cost; however, the present invention does not preclude the use of bi-directional communication channels (such as telephone lines) as means for distributing broadcast (i.e., one to many) information.

Current technology allows the size of antenna 116 to be as small as 2 feet. The costs of antenna 116 and transponder interface 132 is already low enough to be within the reach of small business or a typical household. The newspaper publisher has to pay for the use of the transponder. However, the costs is comparable to the printing and distribution costs of printed newspaper. It is anticipated that the costs of the newspaper distribution system in accordance with the present invention will be lowered as the number of subscribers increases.

Figure 3:
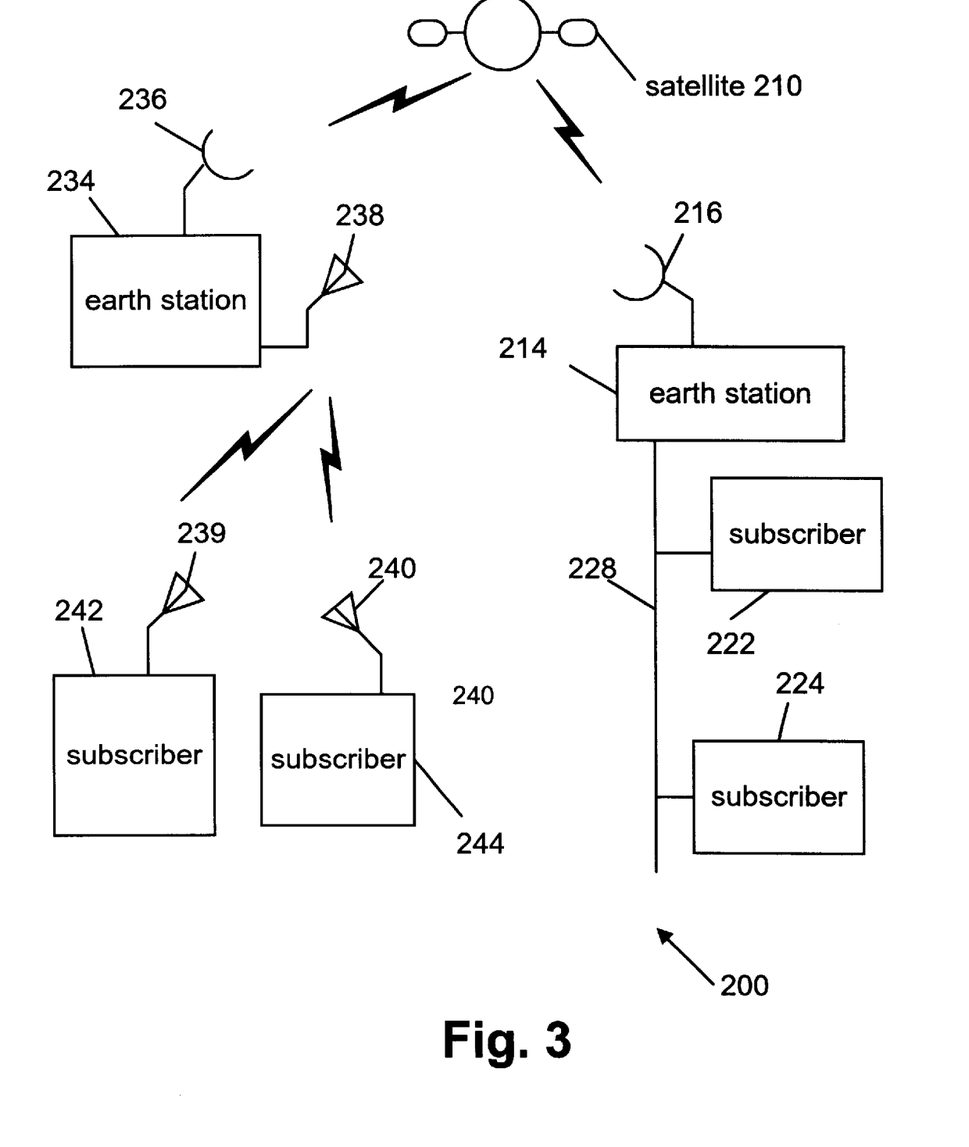
FIG. 3 shows another embodiment of the information distribution system of the present invention.

FIG. 3 shows another embodiment of a newspaper distribution system 200 of the present invention. System 200 contains a satellite transponder 210, an earth station 214, and a plurality of subscriber units, such as units 222 and 224. Transponder 210 functions in a similar way as transponder 110 of FIG. 1 and subscriber units 222 and 224 function in a similar way as subscriber units 102 and 104 of FIG. 1. Earth station 214 receives digital data transmitted by transponder 210 using an antenna 216. The data is distributed to subscriber units 222 and 224 via wired communication channel 228, such as cable and optic fiber. Other earth stations could be placed in strategic locations throughout the country to serve their respective subscribers in a similar manner as earth station 214 and subscriber units 222 and 224. As a result, a large geographic area can be served simultaneously by satellite transponder 210. The advantage of this embodiment is that the equipment costs incurred by the subscriber units are low.

In some locations, it may not be desirable to use wired communication channel to link an earth station to subscribers. In such case, wireless communication channel could be used. FIG. 3 shows an earth station 234 which receives transponder signal from transponder 210 using an antenna 236. Earth station 234 in turn broadcasts the digital data to its subscribers, such as subscriber units 242 and 244.

In one embodiment of system 200, teletext technology is used to link earth station 234 and subscriber units 242 and 244. Thus, earth station 234 could be located adjacent to a television transmission station. The digital data received by earth station 234 can be integrated to the vertical blanking interval of a TV signal, which is broadcasted using an antenna 238. Subscriber units 242 and 244 receive the signal using antennas 239, and 240, respectively. The digital data is then retrieved. Various improvements and refinements of the teletext technology are well known and can be incorporated into system 200.

It should be obvious to a person skilled in the art that systems 100 and 200 are not limited to the distribution of newspaper. Further, electronic newspapers of the future may contains contents which are not available in the printed version, such as video and other multimedia compositions. Other information, such as magazines, graphic images, electronic mails, computer games, multimedia work, or interactive movie, could also be advantageously distribution using a system similar to systems 100 and 200. For example, if it is desirable to distribute interactive movie, the non-interactive portion can be broadcasted while the interactive portion is delivered using a bi-directional channel.

There has thus shown and described a novel information distribution system. Many changes, modifications, variations and other uses and applications of the subject invention will become apparent to those skilled in the art after considering this specification and the accompanying drawings. All such changes, modifications, variations, uses, and applications are covered by the scope of this invention which is limited only by the appended claims.

What is claimed is:

1. An information distribution system for distributing information to a remote site, said remote site having a local display device used by a user to display said information, said remote site being associated with a central site containing a first set of digital data said system comprising:
   a receiving device located in said remote site;
   a transmitter transmitting radio frequency signals, said radio frequency signals comprising an alert signal and a second set of digital data, said second set of digital data comprises a first set of displayable data, a second set of displayable data, a first set of non-displayable data indicating a presence of said second set of displayable data; and a non-displayable first linkage reference associated with said second set of displayable data and said first set of digital data, said alert signal being used to alert said receiving device of a transmission of said second set of disital data; and
   said receiving device comprising:
      a receiver for receiving said radio frequency signals;
      a data interface for retrieving said second set of digital data from said received radio frequency signals;
      means for displaying said first set of displayable data on said display device;
      means for displaying said second set of displayable data on said display device in a way that indicates said second set of displayable data is selectable by said user;
      an input device for allowing said user to select at least a portion of said second set of displayable data;
      means for extracting said first linkage reference after said at least a portion of said second set of displayable data is selected; and
      a communication interface for sending said extracted first linkage reference to said central site.

2. The system of claim 1 wherein said second set of digital data is encrypted and wherein said receiving device further comprises means for decrypting said encrypted data.

3. The system of claim 1 wherein said second set of digital data further comprises a second set of non-displayable data for indicating a presence of said first linkage reference.

4. The system of claim 1 wherein said transmitter is a satellite transponder.

5. The system of claim 1 wherein said second set of digital data further comprises video data.

6. The system of claim 1 wherein said second set of digital data further comprises electronic mails.

7. The system of claim 1 wherein said radio frequency signals are television frequency signals.

8. The system of claim 7 wherein said second set of digital data is integrated into a portion of said television frequency signals.

9. The system of claim 1 wherein said transmitter transmitting said radio frequency signals without initiated by said receiving device.

10. The system of claim 9 wherein said second set of digital data is encrypted and wherein said receiving device further comprises means for decrypting said encrypted data.

11. The system of claim 9 wherein said second set of digital data further comprises a second set of non-displayable data for indicating a presence of said first linkage reference.

12. The system of claim 9 wherein said transmitter is a satellite transponder.

13. The system of claim 9 wherein said second set of digital data further comprises video data.

14. The system of claim 9 wherein said second set of digital data further comprises electronic mails.

15. The system of claim 9 wherein said radio frequency signals are television frequency signals.

16. The system of claim 15 wherein said second set of digital data is integrated into a portion of said television frequency signals.

17. The system of claim 1 wherein said central site contains a third set of digital data, wherein said first set of digital data comprises a second linkage reference associated with said third set of digital data, and wherein said communication interface further receives said first set of digital data after said at least a portion of said second set of displayable data is selected.

18. The system of claim 17 wherein said radio frequency signals are television frequency signals.

19. The system of claim 17 wherein said second set of digital data further comprises video data.

20. The system of claim 17 wherein said second set of digital data further comprises electronic mails.

21. A method for distributing information to a remote site, said remote site having a receiving device connected to a local display device, said remote site being associated with a central site containing a first set of digital data, said method comprising the steps of:

intermittently transmitting first radio frequency signals containing digital data, said digital data comprising a second set of digital data, said second set of digital data comprises a first set of displayable data, a second set of displayable data, a first set of non-displayable data indicating a presence of said second set of displayable data, and a non-displayable first linkage reference associated with said second set of displayable data and said first set of digital data;

prior to transmitting said second set of digital data, transmitting second radio frequency signals containing an alert signal for alerting said receiving device of a transmission of said second set of digital data;

receiving, by said receiving device, said first and said second radio frequency signals;

retrieving, by said receiving device, said second set of digital data from said received first radio frequency signals;

displaying said first set of displayable data on said display device;

displaying said second set of displayable data on said display device in a way that indicates said second set of displayable data is selectable by a user;

allowing, by said receiving device, said user to select at least a portion of said second set of displayable data;

extracting, by said receiving device, said first linkage reference after said at least a portion of said second set of displayable data is selected; and sending, by said receiving device, said extracted first linkage reference to said central site.

22. The method of claim 21 wherein said second set of digital data is encrypted and wherein said method further comprises a step of decrypting, by said receiving device, said encrypted data.

23. The method of claim 21 wherein said second set of digital data further comprises a second set of non-displayable data for indicating a presence of said first linkage reference.

24. The method of claim 21 wherein said first and said second radio frequency signals are transmitted using a satellite transponder.

25. The method of claim 21 wherein said second set of digital data further comprises video data.

26. The method of claim 21 wherein said second set of digital data further comprises electronic mails.

27. The method of claim 21 wherein said first radio frequency signals are television frequency signals.

28. The method of claim 27 wherein said second set of digital data is integrated into a portion of said television frequency signals.

29. A method for distributing information to a remote site, said remote site having a receiving device connected to a local display device, said remote site being associated with a central site containing a first set of digital data, said method comprising the steps of, transmitting first radio frequency signals containing a second set of digital data, said second set of digital data comprises a first set of displayable data, a second set of displayable data, a first set of non-displayable data indicating a presence of said second set of displayable data and a non-displayable first linkage reference associated with said second set of displayable data and said first set of digital data, transmitting second radio frequency signals containing an alert signal for alerting said receiving device of a transmission of said second set of digital data;

receiving, by said receiving device, said first and said second radio frequency signals;

retrieving, by said receiving device, said second set of digital data from said received first radio frequency signals;

displaying said first set of displayable data on said display device;

displaying said second set of displayable data on said display device in a way that indicates said second set of displayable data is selectable by a user;

allowing, by said receiving device, said user to select at least a portion of said second set of displayable data;

extracting, by said receiving device, said first linkage reference after said at least a portion of said second set of displayable data is selected; and sending, by said receiving device, said extracted first linkage reference to said central site;

wherein said central site contains a third set of digital data, wherein said first set of digital data comprises a second linkage reference associated with said third set of digital data, and wherein said method further comprises a step of receiving, by said receiving device, said first set of digital data after said at least a portion of said second set of displayable data is selected.

30. The method of claim 29 wherein said first radio frequency signals are television frequency signals.

31. The system of claim 30 wherein said second set of digital data is integrated into a portion of said television frequency signals.

32. The method of claim 29 wherein said second set of digital data further comprises video data.

33. The method of claim 29 wherein said second set of digital data further comprises electronic mails.

34. The method of claim 29 wherein said second set of digital data further comprises a second set of non-displayable data for indicating a presence of said first linkage reference.

35. The method of claim 34 wherein said first radio frequency signals are television frequency signals.

36. An information distribution system for distributing information to a remote site, said remote site having a local display device used by a user to display said information, said remote site being associated with a central site containing a first set of digital data, said system comprising:

a transmitter transmitting radio frequency signals comprising a second set of digital data, said second set of digital data comprises a first set of displayable data, a second set of displayable data, a first set of non-displayable data indicating a presence of said second set of displayable data, and a non-displayable first linkage reference associated with said second set of displayable data and said first set of digital data; and a receiving device located in said remote site, comprising:
a timing device;
a receiver receiving said radio frequency signals at times determined by said timing device;
a data interface for retrieving said second set of digital data from said received radio frequency signals;
means for displaying said first set of displayable data on said display device;
means for displaying said second set of displayable data on said display device in a way that indicates said second set of displayable data is selectable by a user;
an input device for allowing said user to select at least a portion of said second set of displayable data;

means for extracting said first linkage reference after said at least a portion of said second set of displayable data is selected; and
a communication interface for sending said extracted first linkage reference to said central site;
wherein said central site contains a third set of digital data, wherein said first set of digital data comprises a second linkage reference associated with said third set of digital data, and wherein said communication interface further receives said first set of digital data after said at least a portion of said second set of displayable data is selected.

37. The system of claim 36 wherein said radio frequency signals are television frequency signals.

38. The method of claim 37 wherein said second set of digital data is integrated into a portion of said television frequency signals.

39. The system of claim 36 wherein said second set of digital data further comprises video data.

40. The system of claim 36 wherein said second set of digital data further comprises electronic mails.

\* \* \* \* \*

UNITED STATES PATENT AND TRADEMARK OFFICE
CERTIFICATE OF CORRECTION

PATENT NO. : 6,289,200 B1
DATED : September 11, 2001
INVENTOR(S) : Hark C. Chan

It is certified that error appears in the above-identified patent and that said Letters Patent is hereby corrected as shown below:

Title page,
Item [56], "References Cited, U.S. PATENT DOCUMENTS" add the following references:

| | | | |
|---|---|---|---|
| -- 3,824,597 | 7/1974 | Berg. | |
| 3,967,202 | 6/1976 | Batz. | |
| 4,081,832 | 3/1978 | Sherman. | |
| 4,191,860 | 3/1980 | Weber. | |
| 4,307,416 | 12/1981 | Spano. | |
| 4,563,702 | 1/1986 | Heller. | |
| 4,635,113 | 1/1987 | Okada et al.. | |
| 4,734,858 | 3/1988 | Sclafy | 364/408. |
| 4,742,544 | 5/1988 | Kupnicki et al. | 380/14. |
| 4,827,508 | 5/1989 | Shear. | |
| 4,965,825 | 10/1990 | Harvey et al.. | |
| 5,010,571 | 4/1991 | Katznelson. | |
| 5,128,981 | 7/1992 | Tsukamoto et al. | 379/58. |
| 5,132,680 | 7/1992 | Tezuka et al. | 340/825. |
| 5,185,794 | 2/1993 | Thompson et al. | 380/17. |
| 5,208,671 | 5/1993 | Tarrant | 358/147. |
| 5,208,857 | 5/1993 | Lebrat | 380/14. |
| 5,237,411 | 8/1993 | Fink et al. | 358/146. |
| 5,239,540 | 8/1993 | Rovira et al. | 370/77. |
| 5,247,347 | 9/1993 | Litteral et al.. | |
| 5,247,575 | 9/1993 | Sprague et al.. | |
| 5,319,707 | 6/1994 | Wasilewski et al. | 380/14. |
| 5,321,748 | 6/1994 | Zeidler et al. | 380/14. |
| 5,321,750 | 6/1994 | Nadan | 380/20. |
| 5,323,148 | 6/1994 | Olazabal et al. | 340/825. |
| 5,327,174 | 7/1994 | Kim | 348/468. |
| 5,335,275 | 8/1994 | Millar et al. | 380/4. |
| 5,335,278 | 8/1994 | Matchett et al. | 380/23. |
| 5,343,494 | 8/1994 | Averst et al. | 375/1. |
| 5,361,399 | 11/1994 | Linquist et al. | 455/561. |
| 5,377,266 | 12/1994 | Katta et al. | 380/20. |
| 5,388,101 | 2/1995 | Dinkins | 370/95. |
| 5,392,023 | 2/1995 | D'Avello et al. | 379/100. |
| 5,393,353 | 2/1995 | Morales | 380/20. |
| 5,432,798 | 7/1995 | Blair | 371/32. |
| 5,444,769 | 8/1995 | Koen et al. | 379/94. |
| 5,452,356 | 9/1995 | Albert | 380/9. |
| 5,539,449 | 7/1996 | Blahut et al. | 348/7. |
| 5,629,867 | 5/1997 | Goldman | 364/514. |
| 5,887,243 | 3/1999 | Harvey et al. | 455/3. -- |

UNITED STATES PATENT AND TRADEMARK OFFICE
CERTIFICATE OF CORRECTION

PATENT NO. : 6,289,200 B1
DATED : September 11, 2001
INVENTOR(S) : Hark C. Chan

It is certified that error appears in the above-identified patent and that said Letters Patent is hereby corrected as shown below:

"OTHER PUBLICATIONS" add the following references:

-- Yoshiko Hara, "Consortium Eyes Satelite-Based E-Book System", Electronic Engineering Times, Oct., 1998.
John P. Hayes, "Computer Architecture and Organization", pp. 398-421, Jan 1988.
Cricket Liu, et al., "Managing Internet Information Services", pp. 279-298, Dec. 1994, O'Reilly & Associates, Inc.
S. Deering, "Host Extensions for IP Multicasting", pp. 1-17, Aug. 1989, Network Working Group, Request for Comments: 1112. --

Signed and Sealed this

Seventh Day of May, 2002

Attest:

Attesting Officer

JAMES E. ROGAN
Director of the United States Patent and Trademark Office